United States Patent [19]

Roberts et al.

[11] Patent Number: 5,182,616
[45] Date of Patent: Jan. 26, 1993

[54] COLOR COMMUNICATION KITS

[75] Inventors: Kenneth G. Roberts; Elaine E. Roberts, both of Warwick, R.I.

[73] Assignee: K. G. Roberts & Associates, East Greenwich, R.I.

[21] Appl. No.: 680,130
[22] Filed: Apr. 3, 1991
[51] Int. Cl.$^5$ .......................... G01I 3/46; G09B 19/00
[52] U.S. Cl. ...................... 356/402; 434/98; 356/421; 356/422
[58] Field of Search ............. 356/416, 421–425, 356/402–411; 434/98, 101, 102, 104

[56] References Cited

U.S. PATENT DOCUMENTS

| | | |
|---|---|---|
| D. 61,820 | 1/1923 | Biro ................................. D11/213 |
| 256,640 | 4/1882 | Clark . |
| D. 257,023 | 9/1980 | Barr ................................. D11/75 |
| 521,192 | 6/1884 | Tilford et al. ....................... 63/14.1 |
| 800,968 | 10/1905 | Anderson . |
| 824,374 | 6/1906 | Munsell . |
| 884,968 | 4/1908 | Wood ................................. 63/30 |
| 993,797 | 5/1911 | Salé ................................... 63/30 |
| 1,092,587 | 4/1914 | Meyers ............................... 63/28 |
| 1,234,974 | 7/1917 | Uhl ..................................... 63/2 |
| 1,385,691 | 7/1921 | Knavs ............................. 63/20 X |
| 1,480,486 | 1/1924 | Allen ................................. 356/421 |
| 1,597,830 | 8/1926 | Rueger . |
| 1,612,791 | 1/1927 | Ames et al. ...................... 356/422 |
| 1,617,024 | 2/1927 | Munsell et al. . |
| 1,709,937 | 4/1929 | Everard ....................... 434/386 X |
| 2,007,264 | 7/1935 | Allen . |
| 2,230,585 | 2/1941 | Canter ................................. 24/41 |
| 2,270,210 | 1/1942 | Barbieri ............................... 63/32 |
| 2,353,744 | 7/1944 | Meyer ............................... 117/66 |
| 3,089,584 | 5/1963 | King ................................. 206/1.8 |
| 3,474,546 | 10/1969 | Wedlake ........................... 434/98 |
| 3,746,161 | 7/1973 | Jones ............................... 206/72 |
| 3,832,070 | 8/1974 | Cox ................................. 356/209 |
| 3,912,521 | 10/1975 | Cline et al. ....................... 106/42 |
| 3,944,368 | 3/1976 | Beesley ............................. 356/30 |
| 3,975,097 | 8/1976 | Minto ............................... 356/30 |
| 3,997,686 | 12/1976 | McClure ............................. 63/1 |
| 4,043,675 | 8/1977 | Guennel et al. ................... 356/191 |
| 4,083,352 | 4/1978 | Andrychuk ......................... 63/32 |
| 4,106,221 | 8/1978 | Selon ............................... 434/386 |
| 4,243,626 | 1/1981 | Prete ............................... 264/153 |
| 4,266,871 | 5/1981 | Ritzi ................................. 356/30 |
| 4,295,347 | 10/1981 | Visconti ............................. 63/32 |
| 4,461,568 | 7/1984 | Welbourn et al. ................. 356/30 |
| 4,482,245 | 11/1984 | Makabe et al. ................... 356/30 |
| 4,490,440 | 12/1984 | Reber ............................... 428/620 |
| 4,508,449 | 4/1985 | Okazaki ............................. 356/30 |
| 4,527,895 | 7/1985 | Rubin ............................... 356/30 |
| 4,534,644 | 8/1985 | Beesley ............................. 356/30 |
| 4,591,215 | 5/1986 | Robbins ........................ 312/234.3 |
| 4,604,329 | 8/1986 | Reber ............................... 428/620 |
| 4,703,020 | 10/1987 | Nakano et al. .................... 501/86 |
| 4,819,453 | 4/1989 | McNamara ........................ 63/28 |
| 4,827,575 | 5/1989 | Delaney ............................. 63/3 |
| 4,835,023 | 5/1989 | Taniguchi et al. ................. 428/15 |
| 4,887,906 | 12/1989 | Koehler ............................. 356/402 |
| 4,920,991 | 5/1990 | Shibahashi et al. ............... 132/73 |
| 5,005,971 | 4/1991 | Davis ............................... 356/30 |

FOREIGN PATENT DOCUMENTS 2036360  6/1980  United Kingdom .
2155197A 9/1985  United Kingdom ............... 356/422

OTHER PUBLICATIONS

Jewelers Circular Keystone Dec. 1987, vol. 159, p. 14.

*Primary Examiner*—F. L. Evans
*Assistant Examiner*—K. P. Hantis
*Attorney, Agent, or Firm*—Nixon & Vanderhye

[57] ABSTRACT

Kits which allow colors to be identified and thereby communicated by their unique chromatic and/or achromatic characteristics include a number of discrete color plaques. These color plaques are preferably arranged in chromatic and achromatic series such that individual plaques may be combined with other plaques to form a stack so that the collective color characteristics of the stack may be observed visually. In preferred embodiments, the chromatic plaques in the kits will be arranged in rows and columns in order of the individual plaque's color hue and value characteristics. The achromatic plaques, on the other hand, are simularly arranged in columns and/or rows in order of the plaque's particular achromatic value characteristic. Since the kits of this invention have the unique capability of allowing chromatic and achromatic plaques to be combined in any selected manner, virtually any color in the spectrum can be matched in any level of hue, chroma and/or value in addition to its particular level of transparency, translucency or opacity.

31 Claims, 3 Drawing Sheets

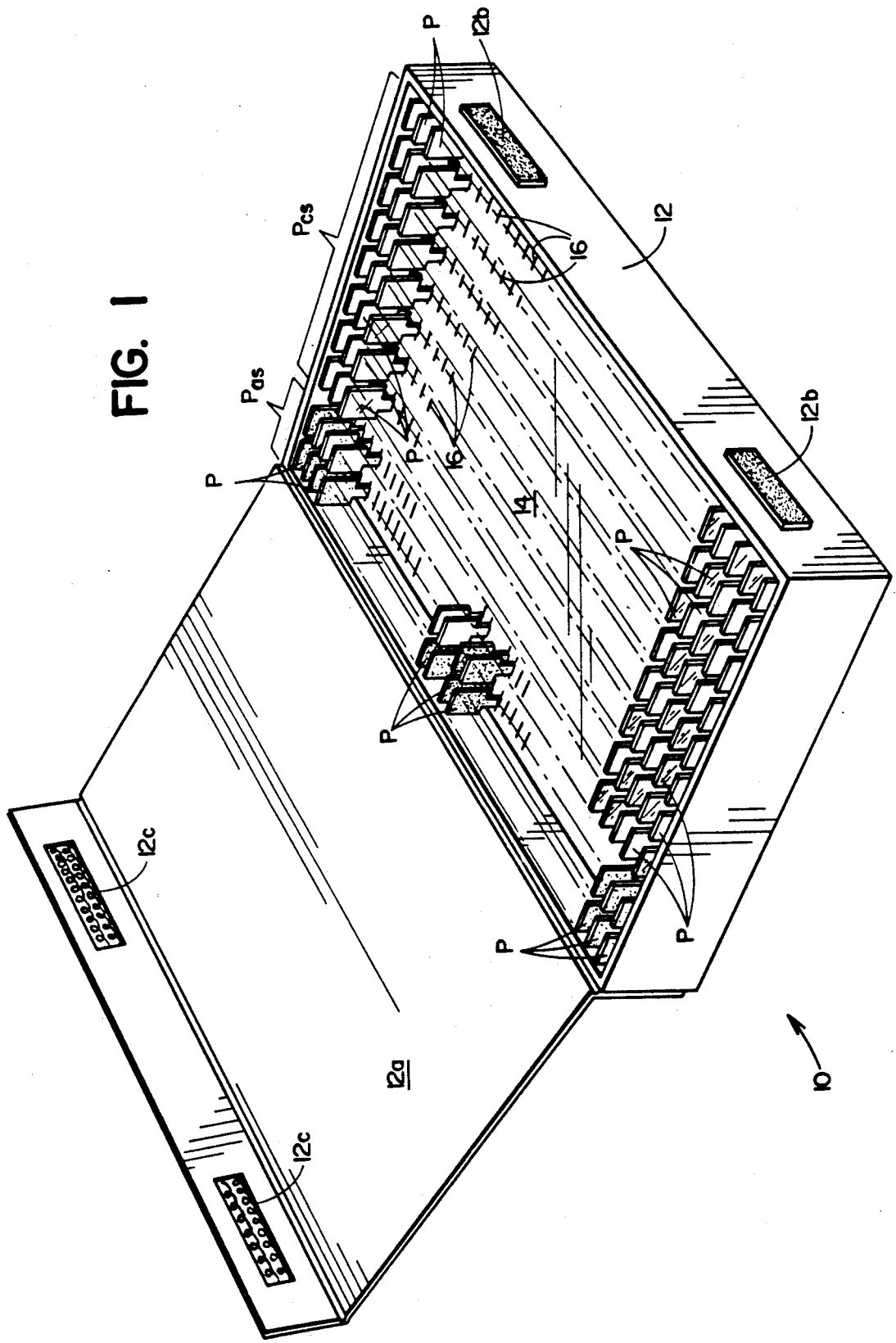

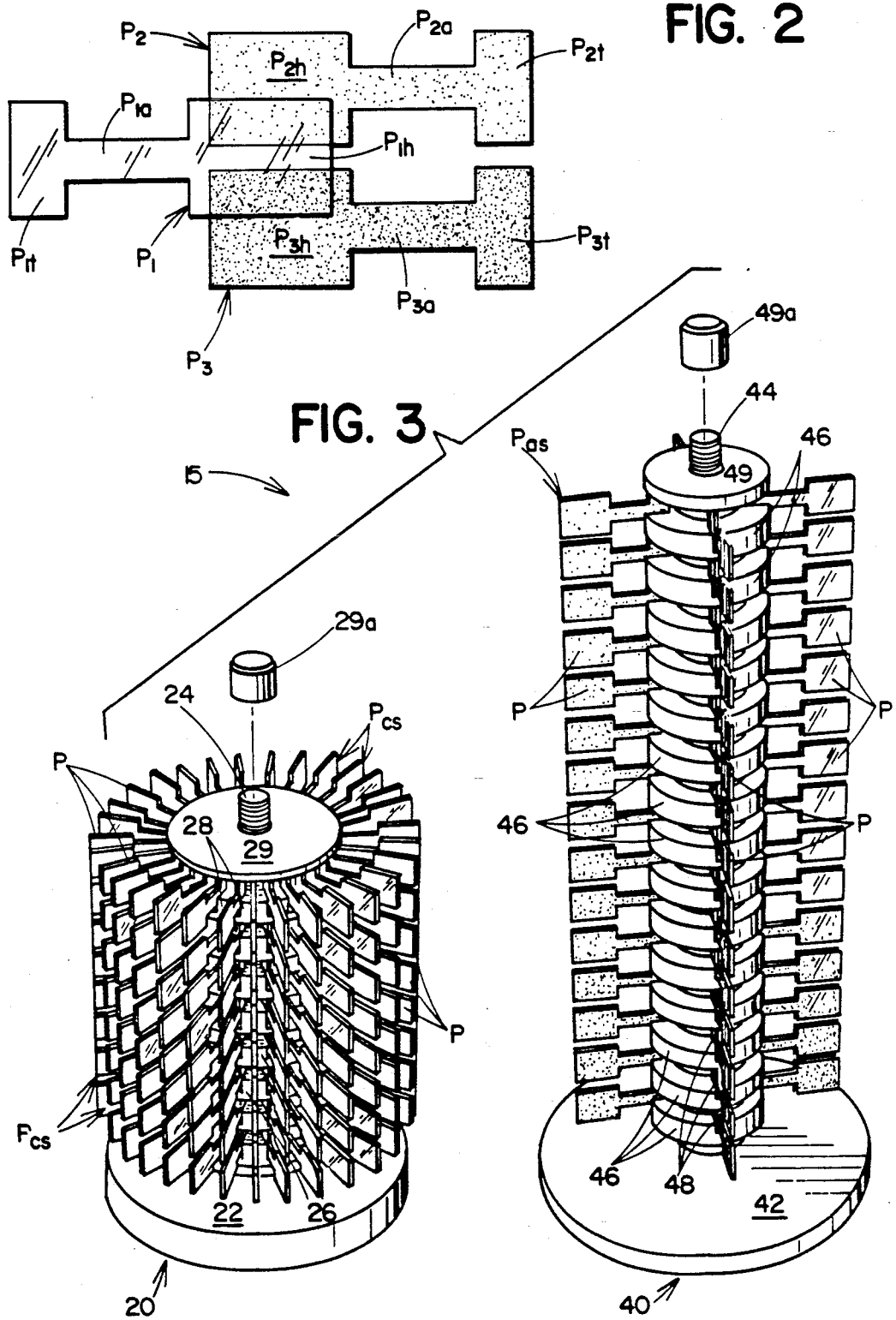

5,182,616

COLOR COMMUNICATION KITS

FIELD OF THE INVENTION

The present invention relates generally to kits that may be employed in commercial and/or educational environments which allow colors to uniquely and objectively be identified and thereby matched by their unique defining chromatic and achromatic characteristics. The color communication kits of this invention therefore find particular utility in virtually any end-use application where color is desired to be communicated objectively to a third party for purposes of color evaluation, analysis, matching and the like.

BACKGROUND AND SUMMARY OF THE INVENTION

Color systems, such as the Munsell (see U.S. Pat. No. 824,374, incorporated fully hereinto by reference) and C.I.E. (Commission Internationale de l'Eclairage) systems, which use the three color coordinates of hue, intensity of saturation or chroma (hereinafter simply referred to as "chroma") and darkness/lightness value (hereinafter simply referred to as "value") are notoriously well known. In this connection, these color coordinate systems enable an essentially three-dimensional color model to be constructed whereby the characteristics of any color may be identified using its unique hue, chroma and value coordinates.

As may be appreciated, a three-dimensional "solid" color model is unwieldy since it is usually difficult to access and use the colors in the model's interior—that is, those colors closely adjacent to the value scale. Thus, various proposals have been made whereby three-dimensional color models are constructed which allow the interior colors in the model to be accessed. In this regard, please see U.S. Pat. Nos. 1,480,486 to Allen and 3,474,546 to Wedlake.

Other "two-dimensional" color systems have also been proposed as evidenced by U.S. Pat. Nos. 1,597,830 to Rueger, 1,612,791 to Ames et al, 1,617,024 to Munsell et al, and 2,007,264 to Allen. In essence, each of these systems provide for an organized two-dimensional arrangement of color patches printed upon an underlying substrate.

More recently, a color grading system for gemstones has been proposed in U.S. Pat. No. 4,527,895 to Rubin whereby so-called color-masking charts (each comprised of a series of sample achromatic color swatches printed upon a transparent flexible film substrate and arranged in increasing amounts of the achromatic color) may be overlaid with chromatic color charts (each comprised of a series of sample chromatic color swatches printed upon a transparent flexible film substrate in increasing intensities of color saturation) so as to closely approximate the color characteristics of particular gemstones.

However, since the system disclosed in the Rubin '895 patent necessarily depends upon color swatches printed upon a transparent substrate, the swatch is exposed to physical abrasion during use such that its integrity and/or quality may degrade over time. As a result, the accuracy of color matches using such a system will likewise degrade over time. In addition, the printed swatches often lack the clarity and/or intensity of color that is intended to be matched so that oftentimes only a close approximation of the actual color characteristics may be achieved.

Thus, it is towards providing more convenient kits that may be used to communicate color more faithfully and objectively.

Broadly, the present invention is based upon ordered series of rigid non-printed color plaques. That is, each of the plaques employed in the kits of this invention is three-dimensional such that its respective color is homogeneously present throughout its depth. In this regard, the plaques of this invention are most preferably formed of a molded plastics material in which the color has been blended uniformly therein prior to or during molding. Since the plaques of this invention do not simply carry printed swatches of color, they are less susceptible to degradation by physical abrasion as compared, for example, to the color communication system disclosed in the Rubin '895 U.S. patent mentioned above.

In preferred forms, the present invention is embodied in a color communication kit which includes a series of discrete rigid chromatic plaques arranged in ordered columns and rows corresponding respectively to the particular hue and chromatic value coordinates for each plaque, and a series of rigid achromatic plaques arranged in at least one ordered column corresponding to the achromatic value coordinate. Any combination of chromatic and/or achromatic plaques may be stacked one on top of the other so as to achieve particular collective color characteristics by means of a visual summing of the color characteristics of the individual combined plaques. In other words, when a selected combination of chromatic and/or achromatic plaques are stacked, the resulting collective color presentation will result in the particular color hue, value and chroma coordinates for that collective color being visually perceived. Preferably a holder device is employed so as to enable the user to stack a number of plaques in any desired combination so as to, in turn, achieve a desired color characterized by a visually perceptible combination of the unique hue, chroma and value coordinates associated with the individual plaques in the stack.

The achromatic color communication plaques employed in the present invention can be either transparent, translucent or opaque and/or can be provided with increasing values of colorless tones as well as "brown" or "black" tones. The achromatic color communication plaques may be provided in the form of a series having completely transparent and opaque plaques at its extremes with an ordered value progression of plaques of varying translucency therebetween. Furthermore, the achromatic plaques may be employed as a means to impart other color qualities and/or characteristics to the chromatic plaques which may be stacked therewith. For example, the achromatic plaques may be in the form of "pearl" or "metallic" qualities in white to gray tones of ordered value.

In one preferred form, the present invention will be embodied in a flat case whereby the series of chromatic plaques are arranged in ordered linear columns and rows corresponding to the respective hue and chromatic value coordinates of the plaques. The achromatic plaques are preferably housed within the same case in ordered linear columns corresponding to the achromatic value coordinate of the respective plaques. In addition, a number of discrete columns of achromatic plaques may be provided depending upon the desired color qualities intended to be communicated. For example, a series of achromatic plaques in varying brown, white, gray or black tone characteristics, and/or a series of achromatic plaques in varying opacity, translucency or transparency characteristics may be provided so as to increase the versatility of the color communication kit.

The plaques in the color communication kits of this invention may also be arranged in the form of a three-dimensional color "wheel" in which the series of chromatic plaques is arranged in vertical columns in order of the respective chromatic value coordinates of the plaques, and in circular rows in order of the respective hue coordinates of the plaques. The achromatic plaques, on the other hand, may likewise be arranged in vertical columns about the periphery of a separate wheel structure, with each column being dedicated to a particular achromatic value characteristic (e.g., varying values of colorless-to-brown, colorless-to-black, white-to-gray-to-black tones, in addition to pearl or metallic characteristics, and the like) as well as a series to determine transparency, translucency and opacity in either brown or black or white-to-gray-to-black tones.

Further aspects and advantages of this invention will become more clear after careful consideration is given to the following detailed description thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is a perspective view of one embodiment of a color communication kit according to the present invention;

FIG. 2 is a plan view of several plaques that are employed in the color communication kits of this invention and depicted in a partially stacked relationship to one another;

FIG. 3 is a perspective view of another color communication kit according to the present invention;

DETAILED DESCRIPTION OF THE PREFERRED EXEMPLARY EMBODIMENTS

Figure 5:
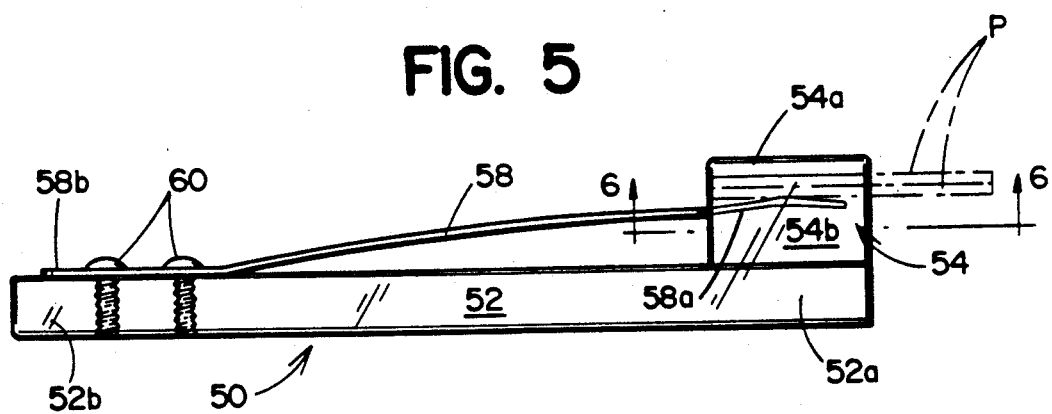
FIG. 5 is a side elevational view of the holder shown in FIG. 4.

One preferred color communication kit 10 according to the present invention is shown in accompanying FIG. 1. As is seen, the kit 10 is in the form of a carrying case 12 in which a bed 14 is provided with a number of slots 16 arranged in linear columns and rows. A cover 12a is preferably provided on the case 12 so that the bed 14 may be protected during transport of the kit 10. The cover 12a may be securely fastened to the case 12 by any suitable means, such as by loop and pile fabric fasteners (e.g., Velcro ® brand fasteners) 12b, 12c so that it may be easily removed when desired to expose the interior bed 14 of the kit 10.

The bed 14 may be in the form of a rigid member (e.g., formed of molded rigid plastics or natural (wood) material), or may be a relatively soft, flexible material, such as a foam plastics or sponge-like material. A number of plaques (a few of which are designated by the letter P) are inserted into the slots 16 so as to stand upright within the interior of the carrying case 12. The slots 16 are sized and configured to accept a portion of the individual plaques P in interference fit so that the plaques remain upright within the carrying case 12 during transport, for example. Since the plaques P are physically placed within the slots 16, they will thereby assume an ordered series of rows and columns corresponding to the rows and columns established by means of the slots 16.

The plaques P within kit 10 are generally comprised of respective chromatic and achromatic series of plaques $P_{cs}$ and $P_{as}$. In this regard, the chromatic series of plaques $P_{cs}$ are arranged in respective columns in the order of the respective hue coordinate for each plaque. The plaques P in the chromatic series of plaques $P_{cs}$ within each row, therefore, will identify a unique chromatic value coordinate for that particular hue. The achromatic series of plaques $P_{as}$, on the other hand may consist of an ordered series of achromatic plaques P of increasing achromatic color tones (e.g., brown, black, white-to-brown, white-to-black tones, and the like) and arranged in order of their achromatic value coordinate.

The achromatic series of plaques $P_{as}$ within the kit 10 may be provided as a multiple series of ordered achromatic plaques, for example, with one series being dedicated to colorless-to-brown tones, colorless-to-black tones, white-to-gray-to-black tones in either opaque, transparent or translucent characteristics. Similarly, the achromatic series of plaques $P_{as}$ may be in the form of specialized characteristics, for example, plaques P having "pearly" or "metallic" characteristics.

Some plaques P are shown in accompanying FIG. 2 and have been designated $P_1$, $P_2$, and $P_3$. Plaque $P_1$ is intended to be representative of a transparent plaque in the chromatic series of plaques $P_{cs}$ according to this invention, whereas plaques $P_2$ and $P_3$ are intended to be representative of white-to-brown tone and white-to-black tone plaques, respectively, within the achromatic series of plaques $P_{cs}$ according to this invention. It will be understood from the above, however, that the plaques $P_2$ and $P_3$ may be selected from virtually any desired achromatic series of plaques. Each of the plaques $P_1$, $P_2$, and $P_3$ are unitary structures respectively comprised of a head portion $P_{1h}$, $P_{2h}$, and $P_{3h}$; a tail portion $P_{1t}$, $P_{2t}$, and $P_{3t}$ having a slightly lesser width as compared to its respective head portion; and an axial arm portion $P_{1a}$, $P_{2a}$, and $P_{3a}$ extending between the respective head and tail portions and being of substantially less width as compared to the widths of both the head and tail portions.

Each of the plaques $P_1$, $P_2$, and $P_3$ is preferably molded from a suitable plastics material using conventional plastics extrusion and/or injection molding techniques. In this regard, the appropriate type and amount of colorants and/or pigments will be melt blended with the plastics material during fabrication of each of the plaques P forming the chromatic and achromatic series of plaques $P_{cs}$ and $P_{as}$ used in the present invention. As a result, the color characteristics of the plaques P will be an inherent color (i.e., will be present throughout the entire depth of the plaque) and will thus not merely be printed on the surface of the plaque where it would be subjected to abrasive wear during use.

Although virtually any suitable resin may be employed to form the plaques P according to known extrusion and/or injection molding techniques, the preferred resin is a methylmethacrylate resin. Methylmethacrylate resin is especially preferred to form the transparent plaques P (either in the chromic or achromic series of plaques $P_{as}$, $P_{cs}$, respectively) due to its desirable refractive index of 1.49 and its capability to transmit at least about 90% of white light. The transmissive qualities of the resin which forms opaque plaques P in the achromatic series of plaques $P_{as}$, however, is not a factor and hence other resins may be employed if desired, the selection of any particular resin being well within the skill of those in the plastics fabrication art.

Although the precise sizes and shapes of the individual plaques are not critical, it is presently preferred that the plaques within a given series be of uniform size and shape and provided with a planar geometry with the head, tail and connecting arm portions as described above. Generally, the preferred plaque will be approximately $1\frac{3}{4}$ inches (approximately $4\frac{1}{2}$ centimeters) long × $\frac{3}{4}$ inch ($1\frac{1}{2}$ centimeters) wide × 1/16 inch ($1\frac{1}{2}$ millimeters) thick.

In use, the color of an object to be matched is compared to the individual plaques P in the chromatic series of plaques $P_{cs}$ until that plaque P which most closely matches the color of the object in terms of its hue and value coordinates is located. The selected chromatic plaque (e.g., plaque $P_1$ in FIG. 2) may then be collectively stacked with various achromatic plaques (e.g., plaques $P_2$ and $P_3$ in FIG. 2) until the closest chroma coordinate is determined. Thereafter, the collective color coordinates (i.e., the sum of the coordinates of the selected plaques most closely matching the object) can be determined manually and/or automatically (for example by means of suitable spectrophotometers whose output is expressed in either standardized Munsell Notation or C.I.E. L*a*b units). The individual plaques P included within the kits of this invention can thus be cross-referenced to both the Munsell Notation or C.I.E. L*a*b units to thereby increase the kit's versatility.

Another embodiment of a kit 15 according to the present invention is depicted in accompanying FIG. 3 in which the chromatic series of plaques $P_{cs}$ and achromatic series of plaques $P_{as}$ are organized in the form of respective carousels 20 and 40. The carousels 20 and 40 each respectively include a base 22 and 42, a center support post 24, 44, and a number of cylindrical spacer blocks 26 and 46 which coaxially receive center support posts 24, 44 so as to be stacked one on top of the other. Each of the spacer blocks 24, 44 is provided with radially extending grooves 28 and 48 spaced apart about the circumference of the respective cylindrical spacer block 26, 46 in which they are formed. The grooves 28 and 48 are sized and configured so as to accept and be in interference fit with the tail portion of a respective one of the plaques associated with the chromatic and achromatic series of plaques $P_{cs}$ and $P_{as}$.

As is seen in FIG. 3, since the tail portions of the individual plaques P are disposed on edge within a respective one of the grooves 28, they extend within respective radial planes extending from the center support posts 24, 44. Thus, ordered columns of individual plaques P are provided in each of the carousels 20, 40. More particularly, the chromatic series of plaques $P_{cs}$ in carousel 20 are arranged such that the value coordinates are positioned in the vertically oriented columns which extend within respective radial planes from the center post 24, whereas the plaques positioned about the circumference of each of the spacer blocks 26 correspond to the hue coordinate for that particular hue. The achromatic series of plaques $P_{as}$ on the other hand, may be arranged in radially extending columns such that each column corresponds to a different value coordinate—for example, varying values of colorless-to-brown, colorless-to-black, white-to-gray-to-black tones as well as plaques of varying opacity, translucency and/or transparency, and specialized plaques (e.g., metallic and or pearly plaques in either brown, gray or black tones).

Since each of the plaques P are disposed on edge in their respective grooves 26 or 46 in carousels 20 and 40, the lower surface of one of the spacer blocks will bear against the tail portion of the plaques in an adjacent lower one of the spacer blocks 26, 46, respectively. As a result, the individual plaques will be maintained in their desired order but may be removed from the carousels 20, 40, respectively, as needed due to the plaques P being in interference fit within the grooves 28, 48. An upper flange plate 29 and 49 and a cap 29a, 49a which is threaded upon the center support post 24, 44, respectively, collectively serve to positional maintain the individual plaques in the carousels 20, 40.

It will be appreciated that greater or lesser numbers of spacer blocks 26, 46 may be provided for each of the carousels 20, 40 (thereby increasing or decreasing the number of plaques P in each of the carousels 20, 40) simply by selecting a center support post of desired axial length to accommodate the selected number of spacer blocks 26, 46 in stacked relationship. In this manner, the number of plaques P within kit 15 shown in FIG. 3 may be expanded/contracted to suit specific needs of end-users.

Figure 4:
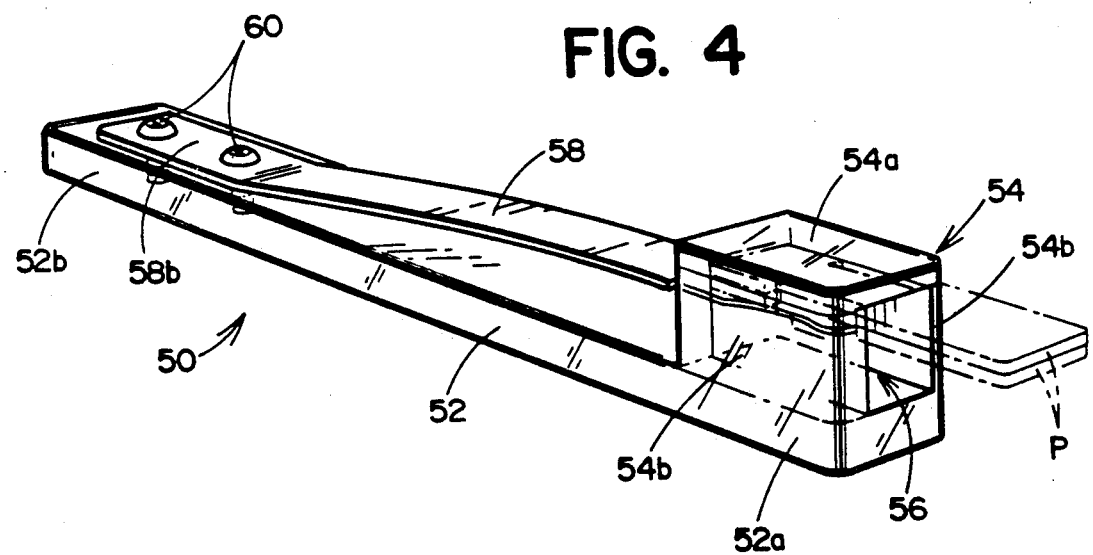
FIG. 4 is a perspective view of a holder adapted to hold a stack of plaques according to the present invention.
Figure 6:
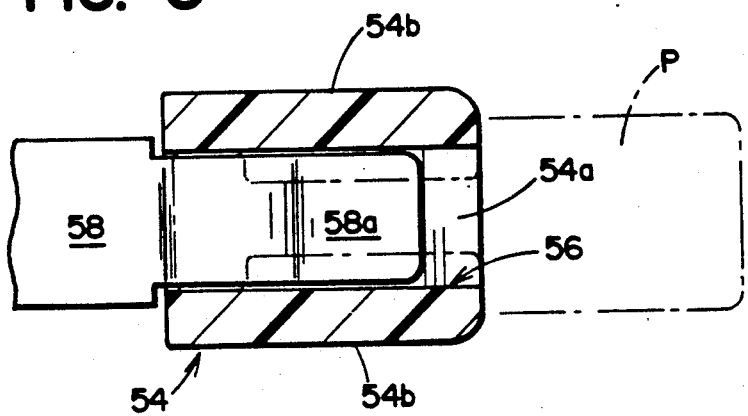
FIG. 6 is a cross-sectional view of the holder shown in FIGS. 4 and 5 as taken along line 6—6 in FIG. 5.

As noted previously, the individual plaques P may physically be stacked with one another so that the combined color characteristics of each plaque may be visually or spectrophotometrically observed. Accompanying FIGS. 4–6 show an especially preferred holder 50 which may be supplied as a component part of the kits 10 or 15 described above and which enables a selected number of the individual plaques P to be held reliably (but releasably) in stacked relationship. The holder 50 is in the form of an elongate handle 52 which includes a housing structure 54 at its forward end 52a. The housing structure 54 establishes an open-ended interior cavity 56 which is sized so as to accept the tail portions of a stack of individual plaques P (a couple of which are shown in phantom line in FIGS. 4–6).

An elongate resilient retaining strip 58 is affixed at its proximal end 58b to the rearward end 52b of the handle 52 by means of screws 60. The forward terminal end 58a (see FIG. 6) is disposed within the interior cavity 56 of the housing structure 54 for movements therewithin. The resilient nature of the retaining strip serves to bias the free terminal end 58b of the strip into an engaged position with the top wall 54a of the housing structure 54. As a result, the tail portions in a stack of individual plaques P are positionally captured between the terminal free end 58a of the retaining strip 58 and the top wall 54a of the housing structure 54. The opposed side walls 54b of the housing 54, on the other hand, prevent lateral movement of the individual plaques P in the stack. In this manner, the stack of plaques P is reliably held within the housing structure 54 of the holder 50, but may be removed therefrom as needed.

It will now be appreciated that the present invention may be employed in virtually any end-use application where color is desired to be communicated objectively to a third party. The kits according to this invention are therefore capable of being employed in commercial and/or educational environments for a variety of purposes, for example, identifying and/or matching an observed color of an object and enabling a person to duplicate that observed color by reference to a combination of stacked chromatic and/or achromatic color plaques.

Thus, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A color communication kit comprising:
a number of discrete rigid three-dimensional color plaques having a selected depth dimension, at least some of said plaques being chromatic color plaques constituting a chromatic series and others of of said plaques being achromatic color plaques constituting an achromatic series;
said chromatic color plaques in said chromatic series being formed of a transparent plastics material and respectively having a unique non-printed color homogeneously present throughout the depth dimension, wherein
said chromatic color plaques in said chromatic series are arranged in order of respective color hue and chromatic value for each of the color plaques therein, and wherein
said achromatic color plaques in said achromatic series are arranged in order of respective achromatic value for each of the plaques therein.

2. A color communication kit as in claim 1, wherein selected ones of said achromatic color plaques within said achromatic series are transparent, translucent or opaque.

3. A color communication kit as in claim 2, wherein said selected ones of said color plaques within said achromatic series include plaques selected from black tones, brown tones, colorless-to-black tones, colorless-to-brown tones, white-to-gray-to-black tones, pearl tones or metallic tones.

4. A color communication kit as in claim 1, further comprising a case, and a bed within said case, wherein said bed includes a number of slots therein which are each sized and configured to accept a portion of a respective one of said chromatic and achromatic color plaques, said slots being aligned in linear columns and rows to thereby provide an ordered arrangement of said chromatic and achromatic color plaques in corresponding linear columns and rows.

5. A color communication kit as in claim 4, wherein said slots in said bed are sized and configured to be in interference fit with said portion of said respective one of said chromatic and achromatic color plaques.

6. A color communication kit as in claim 5, wherein said bed is formed of a rigid or resilient material.

7. A color communication kit as in claim 1, wherein at least said chromatic color plaques within said chromatic series are arranged in a chromatic carousel wherein each of said chromatic color plaques radially extends therefrom.

8. A color communication kit as in claim 7, wherein said chromatic color plaques are arranged in vertical columns in order of their respective color value, and in circular rows in order of their respective color hue.

9. A color communication kit as in claim 7 or 8, wherein said chromatic carousel includes a number of coaxial vertically stacked spacer blocks each having radial slots formed about its circumference which are sized and configured to accept therewithin a portion of a respective one of said chromatic and achromatic color plaques.

10. A color communication kit as in claim 9, wherein said chromatic carousel includes a center support post, and wherein said spacer blocks are removably stacked coaxially on said center support post.

11. A color communication kit as in claim 7 or 8, wherein said achromatic series of color plaques are arranged in an achromatic carousel separate from said chromatic carousel, said color plaques in said achromatic series radially extending from said achromatic carousel and being arranged in vertical columns in order of their respective achromatic color value.

12. A color communication kit as in claim 11, wherein each of said and said second chromatic and achromatic carousels includes a center support post, and a number of spacer blocks each having radially extending grooves spaced apart around its circumference and adapted to receive a portion of a respective color plaque therewithin.

13. A color communication kit as in claim 4, wherein each of said chromatic and achromatic color plaques is a one-piece planar structure having a head portion and a radially extending arm portion.

14. A color communication kit as in claim 13, wherein said arm portion terminates in a tail portion of lesser width as compared to said head portion.

15. A color communication kit as in claim 14, wherein said tail portion is received within said slots so that said head portion thereof extends vertically thereabove.

16. A color communication kit as in claim 12, wherein each of said chromatic and achromatic color plaques is a one-piece planar structure having a head portion and a radially extending tail portion.

17. A color communication kit as in claim 16, wherein said tail portion is received within said grooves so that said head portion thereof radially extends outwardly therefrom.

18. A color communication kit as in claim 1 or 7, further comprising a holder adapted to collectively hold a number of said color plaques in stacked relationship with one another.

19. A color communication kit as in claim 18, wherein said holder includes a handle, a housing structure which defines a cavity sized and configured to accept respective portions of said color plaques when in said stacked relationship, and a resilient retaining strip which exerts a bias force against the stack of color plaques so as to retain the stack in said housing structure.

20. A color communication kit as in claim 19, wherein said cavity of said housing structure is defined by means of a pair of opposing side walls fixed to a forward end of said handle, and a top wall spaced above said forward end of said handle and extending between a fixed to each of said side walls.

21. A color communication kit as in claim 20, wherein said retaining strip includes a proximal end fixed to a rearward end of said handle, and a terminal free end which is movably disposed within said housing structure.

22. A color communication kit as in claim 21, wherein said retaining strip exerts a bias force against the color plaques in the stack in a direction towards said top wall.

23. A color communication kit comprising a number of discrete rigid three-dimensional color members having a selected depth dimension and being formed of a transparent plastics material, wherein a selected number of said color members each have a unique non-printed color homogeneously present throughout the depth dimension, which color is different in at least one of hue and value characteristics as compared to the hue and value characteristics of others of said color members, wherein selected individual ones of said color members are adapted to being overlaid with selected others of said colors members to achieve a color corresponding to a combination of the hue and value characteristic of said selected individual ones and others of said overlaid color members.

24. A color communication kit as in claim 23, further comprising a number of opaque color members.

25. A color communication kit as in claim 24, wherein said opaque color members are selected from black tones, brown tones, colorless-to-black tones, colorless-to-brown tones, white-to-gray-to-black tones, pearl tones and metallic tones.

26. A color communication kit as in claim 24 or 25, wherein said opaque color members are rigid three-dimensional structures having thickness dimension and a respective non-printed color which is present homogeneously throughout the thickness dimension.

27. A color communication kit as in claim 23, wherein at least said number of said color members are planar.

28. A color communication kit as in claim 23, wherein said color member are arranged in an ordered series in dependence upon respective hue and value characteristics.

29. A color communication kit as in claim 28, further comprising means for maintaining said color members in said ordered series in dependence upon respective hue and value characteristics.

30. A color communication kit as in claim 23 or 28, which further comprises a second series of color members which are selected from transparent, translucent or opaque colors.

31. A color communication kit as in claim 30, wherein said second series of color members is achromatic.

* * * * *